June 9, 1964  W. R. JARRETT  3,136,030
TOOL HOLDER
Filed March 20, 1963

INVENTOR.
WILLIAM R. JARRETT
BY
Lockwood, Woodard, Smith & Weikert
Attorneys

United States Patent Office 3,136,030
Patented June 9, 1964

3,136,030
TOOL HOLDER
William R. Jarrett, Sharpsville, Ind.
Filed Mar. 20, 1963, Ser. No. 266,674
5 Claims. (Cl. 29—96)

This invention relates generally to a tool holder arrangement for use with automatic bar machines, chucking lathes and various other applications, and more particularly relates to a tool holder arrangement which is quickly changed yet does not thereby sacrifice a sturdy firm mounting.

One object of the invention is to provide an improved tool holder arrangement.

The tool holders conventionally provided for use with automatic bar machines conventionally take the form of a base member upon which a cutting or forming tool is removably mounted by means of a plurality of machine screws. Mounting and demounting of a tool in this conventional type of tool holder requires an appreciable length of time, of the order of fifteen minutes. Since the average tool must be changed after every six to eight hours of operating time, it may be seen that changing of tools in a tool holder involves considerable "down time" of the machine when operated through a prolonged working period. Further, the conventional type of tool holder requires use of a variety of sizes of wrenches by the operator or set-up man in the tool changing operation. The set-up man is thus required to maintain a supply of variously sized wrenches, and in completing the tool changing operation, bruised knuckles or other more serious injuries are commonplace as a result of wrench-slipping.

Consequently, one object of the present invention is to provide a quick-change tool holder by means of which tools may be replaced in a time period which is of the order of one minute or less, as compared to the ten or fifteen minute time period required for this operation with conventional tool holders.

Still another important object of the present invention is to provide a tool holder which is constructed to insure a firm sturdy mounting whether or not certain mounting surfaces on the holder and tool are or are not dirty or have small specks of dirt or the like thereon.

Still further objects of the present invention are to provide a tool holder arrangement which eliminates the use of wrenches in the tool changing operation thereby generally simplifying this operation and reducing the likelihood of injury to the operator; and to provide a tool holder assembly characterized by positive clamping of the tool therein whereby loosening and subsequent retightening of the clamp always returns the tool quite closely to its original position to maintain the required tolerance on the work.

Related objects and advantages of the invention will become apparent as the description proceeds.

One embodiment of the invention might include a tool holder arrangement comprising a base member and a clamp member formed to jointly provide a dovetail slot for receiving the mating boss of a tool to be held in said holder, and fastener means for mounting said clamp member on said base member.

The full nature of the invention will be understood from the accompanying drawings and the following description and claims:

Figure 1:
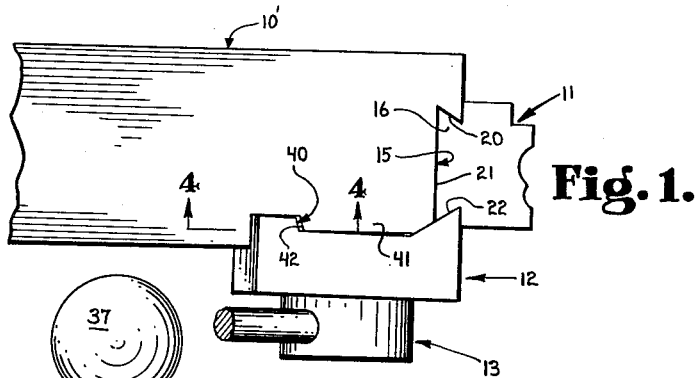
FIG. 1 is a top plan view with portions thereof broken away of a tool holder assembly embodying the present invention.
Figure 2:
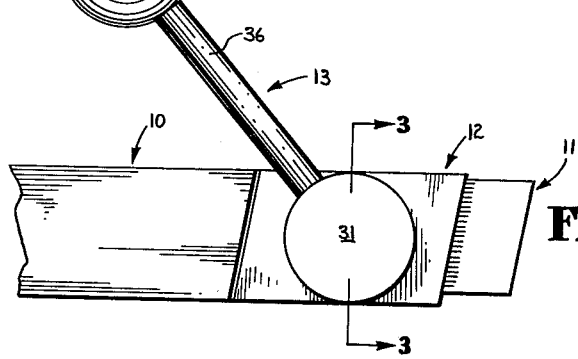
FIG. 2 is a side elevation of the structure illustrated in FIG. 1.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a tool holder assembly including an elongated base member 10 upon the end of which is mounted a tool 11. The base member and tool may be part of various machines such as, for example, a lathe wherein the tool 11 engages the workpiece and is held in position by the base member 10. A clamp member 12 is mounted on the base member by fastener means 13. The base member 10 and clamp member 12 jointly provide a dovetail slot 15 within which the boss 16 of the tool 11 is gripped.

The dovetail slot 15 includes three surfaces 20, 21 and 22. The surfaces 20 and 21 are on the base member 10 while the surface 22 is on the clamp 12.

Figure 3:
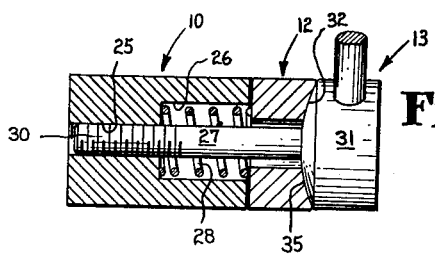
FIG. 3 is a section taken along the line 3—3 of FIG. 2 in the direction of the arrows.

The base 10 has a threaded bore 25 therethrough which adjoins counterbore 26. A fastener 13 includes a first cylindrical portion 27 which is threaded at 30 and threadedly engages the threaded bore 25. Received within the counterbore 26 is a spiral compression spring 28 which bears against the base 10 and the clamp 12 and normally urges the clamp 12 into engagement with an enlarged generally cylindrical portion 31 of the fastening means 13. It can be appreciated that if the fastening means 13 is partially unthreaded to the right from the position illustrated in FIG. 3, the compression spring 28 will act to separate the surfaces 20 and 22 whereby the boss 16 of the tool 11 may be easily inserted into the dovetail slot 15.

The enlarged portion 31 and the clamp 12 have mutually engaging part-spherical bearing surfaces 32 and 35. Consequently, when the fastening means 13 is threaded into the base, a uniform force urges the clamp 12 into engagement with the boss of the tool even though the clamp may, for some reason or another, be canted relative to the base. For example, a speck of dirt may be present between the boss and the surface 22 which may cause the clamp to assume an angle other than that which it normally assumes in engaging the boss. Even so, the part-spherical surfaces 32 and 35 will engage one another over a broad area so that a uniform force will be exerted firmly gripping the tool.

The fastener means 13 further includes a lever 36 which may be secured to the enlarged portion 31 in any suitable manner such as, for example, by threading thereinto. On the distal end of the lever 36 is a spherical knob 37 which facilitates operation of the lever 36. The lever 36 extends radially of the axis of the cylindrical portions 27 and 31 so that the lever may be used to thread and unthread the fastening means.

A further important feature of the invention is the fact that the clamp 12 has a second bearing surface 40 which diverges from the first bearing surface 22 as the bearing surface 40 extends toward the base 10. Each of the surfaces 40 and 22 are at an acute angle to the axis of the cylindrical portion 27 of the fastening means. When the clamp is tightened down by means of the fastening means, the clamp is moved upwardly as viewed in FIG. 1 which causes the diverging surfaces 22 and 40 to straddle the boss 16 and the projecting portion 41 of the base 10. The projecting portion 41 of the base 10 has a tapering surface 42 against which the surface 40 of the clamp bears. The surface 42 of the base tapers in such a direction that the movement of the surface 40 thereacross urges the clamp leftwardly as viewed in FIG. 1. The clamp does not move leftwardly because the movement of the surface 22 across the boss urges the clamp rightwardly. This straddling action causes the boss to be firmly seated against the surfaces 20 and 21 of the base.

Figure 4:
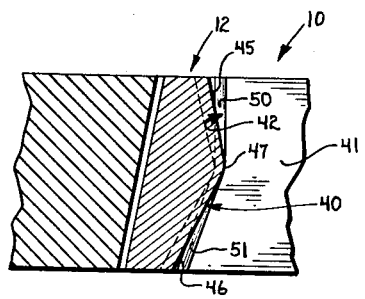
FIG. 4 is an enlarged section taken along the line 4—4 of FIG. 1 in the direction of the arrows.

A further important feature of the invention is embodied in the two flat portions 45 and 46 making up the surface 40 of the clamp. Referring to FIG. 4, it can be seen that these surfaces are at an obtuse angle to one another and define a blunted point 47. The surface 42 of the base 10 is also two-portioned and the two portions 50 and 51 are at a greater obtuse angle to one another than are the two portions 45 and 46 of the surface 40. The difference in angles between these two surfaces has been exaggerated in FIG. 4 for clarity of illustration. It can be appreciated that the arrangement illustrated in FIG. 4 provides a fulcrum at the blunted point 47. Consequently, if a speck of dirt is located between the surfaces 40 and 42, the clamp is not canted relative to the base at as great an angle as it would be were the surfaces 40 and 42 completely flat all the way across.

From the above description, it can be appreciated that the present invention provides an improved tool holder arrangement which is constructed to insure a firm sturdy mounting whether or not certain mounting surfaces on the holder and tool are or are not dirty or have small specks of dirt or the like thereon. It can also be appreciated from the above description that the present invention provides a tool holder arrangement which makes possible fast tool change.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A tool holder arrangement comprising a base member and a clamp member formed to jointly provide a dovetail slot, a tool having a boss mating with said dovetail slot, fastener means for mounting said clamp member on said base member, said fastener means including a threaded first cylindrical portion extending through said clamp and threadedly engaging said base member and an enlarged generally cylindrical portion integral and coaxial with said first cylindrical portion, said enlarged portion and clamp having mutually engaging part-spherical bearing surfaces, said clamp having a first surface which forms one of the converging surfaces of said dovetail slot and engages said boss, said first surface extending at an acute angle to the axis of said first cylindrical portion, said clamp having a second surface on the other side of said fastener from said first surface and engaging said base member, said second surface diverging away from said first surface and the axis of said first cylindrical portion as said second surface extends toward said base member, said second surface including two flat portions at an angle to one another and defining an obtuse-angled blunted point which projects toward said first surface, said base having a two-portioned surface which said second surface engages, said two-portioned surface defining a recess the two portions of which are flat and are at a greater obtuse angle to one another than the two portions of said second clamp surface.

2. A tool holder arrangement comprising a base member and a clamp member formed to jointly provide a dovetail slot, a tool having a boss mating with said dovetail slot, fastener means for mounting said clamp member on said base member, said fastener means including a threaded cylindrical portion extending through said clamp and threadedly engaging said base member and an enlarged generally cylindrical portion integral and coaxial with said first cylindrical portion, said enlarged portion and clamp having mutually engaging part-spherical bearing surfaces, a lever secured to said enlarged portion and extending radially therefrom, and a spiral compression spring received on said first cylindrical portion and bearing against said base and enlarged portion, said clamp having a first surface which forms one of the converging surfaces of said dovetail slot and engages said boss, said clamp having a second surface on the other side of said fastener from said first surface, and engaging said base member, said second surface diverging away from said first surface as said second surface extends toward said base member, said second surface including two flat portions defining an obtuse-angled blunted point which projects toward said first surface, said base having a two-portioned surface which said second surface engages, said two-portioned surface defining a recess the two portions of which are at a greater obtuse angle to one another than the two portions of said second clamp surface.

3. A tool holder arrangement comprising a base member and a clamp member formed to jointly provide a dovetail slot, a tool having a boss mating with said dovetail slot, and fastener means for mounting said clamp member on said base member, said fastener means including a threaded first cylindrical portion extending through said clamp and threadedly engaging said base member and an enlarged generally cylindrical portion integral and coaxial with said first cylindrical portion, said enlarged portion and clamp having mutually engaging part-spherical bearing surfaces, said clamp having a first surface which forms one of the converging surfaces of said dovetail slot and engages said boss, said clamp having a second surface on the other side of said fastener from said first surface, and engaging said base member, said second surface diverging away from said first surface as said second surface extends toward said base member, said second surface including two portions defining an obtuse-angled blunted point which projects toward said first surface, said base having a two-portioned surface which said second surface engages, said two-portioned surface defining a recess the two portions of which are at a greater obtuse angle to one another than the two portions of said second clamp surface.

4. A tool holder arrangement comprising a base member and a clamp member formed to jointly provide a dovetail slot, said clamp having a first surface which forms one of the converging surfaces of said dovetail slot and engages said boss, said clamp having a second surface engaging said base member, said second surface diverging away from said first surface as said second surface extends toward said base member, said second surface including two portions defining an obtuse-angled blunted point which projects toward said first surface, said base having a two portioned surface which said second surface engages, said two-portioned surface defining a recess the two portions of which are at a greater obtuse angle to one another than the two portions of said second clamp surface, and fastener means mounting said clamp member on said base member and exerting a force between said first and second surfaces urging said clamp member toward said base member.

5. A tool holder arrangement comprising a base member and a clamp member formed to jointly provide a dovetail slot, a tool having a boss mating with said dovetail slot, said clamp having a first surface which forms one of the converging surfaces of said dovetail slot and engages said boss, said clamp having a second surface engaging said base member, said second surface diverging away from said first surface as said second surface extends toward said base member, said second surface including two portions defining an obtuse-angled blunted point which projects toward said first surface, said base having a two portioned surface which said second surface engages, said two-portioned surface defining a recess the two portions of which are at an obtuse angle to one another generally the same as the obtuse angle of the two portions of said second clamp surface, and fastener means mounting said clamp member on said base member and exerting a force between said first and second surfaces urging said clamp member toward said base member.

References Cited in the file of this patent

UNITED STATES PATENTS

| | | |
|---|---|---|
| 854,100 | Meadowcraft | May 21, 1907 |
| 1,855,971 | Kilmer | Apr. 26, 1932 |
| 2,183,796 | Saffady | Dec. 19, 1939 |
| 2,370,273 | Ulliman | Feb. 27, 1945 |
| 2,684,608 | Roman | July 27, 1954 |
| 2,838,827 | Wright | June 17, 1958 |
| 2,903,781 | Hudson | Sept. 15, 1959 |
| 2,911,707 | Almen | Nov. 10, 1959 |
| 2,986,056 | Irwin | May 30, 1961 |

FOREIGN PATENTS

| | | |
|---|---|---|
| 968,199 | France | Apr. 12, 1950 |
| 896,903 | Germany | Nov. 16, 1953 |